United States Patent
Hong et al.

(10) Patent No.: US 10,704,997 B2
(45) Date of Patent: Jul. 7, 2020

(54) METHOD FOR EVALUATING PROPERTIES OF PLASTIC RESIN PRODUCT

(71) Applicant: LG CHEM, LTD., Seoul (KR)

(72) Inventors: Bog Ki Hong, Daejeon (KR); Sung Hyun Park, Daejeon (KR); Hyun Sup Lee, Daejeon (KR); Yi Young Choi, Daejeon (KR); Myung Han Lee, Daejeon (KR); Soon Ho Sun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 217 days.

(21) Appl. No.: 15/749,870

(22) PCT Filed: Mar. 9, 2017

(86) PCT No.: PCT/KR2017/002587
§ 371 (c)(1),
(2) Date: Feb. 2, 2018

(87) PCT Pub. No.: WO2017/160024
PCT Pub. Date: Sep. 21, 2017

(65) Prior Publication Data
US 2018/0217039 A1    Aug. 2, 2018

(30) Foreign Application Priority Data

Mar. 16, 2016  (KR) .................. 10-2016-0031484

(51) Int. Cl.
*G01N 3/08*  (2006.01)
*G01N 3/04*  (2006.01)
(Continued)

(52) U.S. Cl.
CPC ............... *G01N 3/08* (2013.01); *B32B 27/32* (2013.01); *G01N 3/04* (2013.01); *G01N 3/14* (2013.01); *G02B 3/00* (2013.01); *G01N 3/30* (2013.01)

(58) Field of Classification Search
None
See application file for complete search history.

(56) References Cited

U.S. PATENT DOCUMENTS 3,790,438 A    2/1974  Lewis et al.
6,946,521 B2   9/2005  Miserque et al.
(Continued)

FOREIGN PATENT DOCUMENTS

CN    1556835 A     12/2004
CN    102245696 A   11/2011
(Continued)

OTHER PUBLICATIONS

ADMET, "Micro Tensile Strength Test of Plastic per ASTM D638", available at https://www.youtube.com/watch?v=58hw2QxxDro, Apr. 23, 2012 (Year: 2012).*
(Continued)

*Primary Examiner* — John C Kuan
(74) *Attorney, Agent, or Firm* — Dentons US LLP

(57) ABSTRACT

The present invention relates to a method for evaluating the properties of a plastic resin molded product, more specifically to a novel method for evaluating the properties of a plastic resin molded product that can exactly derive impact resistance of practically prepared molded products, using the property measurement values by the existing ASTM.

7 Claims, 2 Drawing Sheets

(51) Int. Cl.
*B32B 27/32* (2006.01)
*G02B 3/00* (2006.01)
*G01N 3/14* (2006.01)
*G01N 3/30* (2006.01)

(56) References Cited

U.S. PATENT DOCUMENTS

| | | |
|---|---|---|
| 7,589,162 B2 | 9/2009 | Krishnaswamy et al. |
| 2001/0039320 A1 | 11/2001 | Jacobsen et al. |
| 2002/0065613 A1 | 5/2002 | Woods et al. |
| 2003/0171492 A1 | 9/2003 | Starita |
| 2005/0239976 A1 | 10/2005 | McDaniel et al. |
| 2009/0314482 A1* | 12/2009 | Heikkila .............. C08K 3/08 165/185 |
| 2010/0152382 A1 | 6/2010 | Jiang et al. |
| 2013/0170053 A1* | 7/2013 | Iseli .................. G02B 7/023 359/819 |
| 2014/0309353 A1 | 10/2014 | Kim et al. |
| 2014/0342141 A1 | 11/2014 | Cui et al. |
| 2015/0232589 A1 | 8/2015 | Best et al. |
| 2016/0229967 A1 | 8/2016 | Cui et al. |
| 2017/0306114 A1 | 10/2017 | Cui et al. |

FOREIGN PATENT DOCUMENTS

| | | |
|---|---|---|
| CN | 103471940 A | 12/2013 |
| CN | 105115821 A | 12/2015 |
| CN | 105488310 A | 4/2016 |
| JP | 2008-115295 A | 5/2008 |
| JP | 2010-243322 A | 10/2010 |
| JP | 2015-142887 A | 8/2015 |
| KR | 10-2008-0114740 A | 12/2008 |
| KR | 10-2011-0014462 A | 2/2011 |
| KR | 10-2015-0057996 A | 5/2015 |
| KR | 10-2016-0016784 A | 2/2016 |

OTHER PUBLICATIONS

Celcon M90 Datasheet, "Celcon M90" UL Prospector, Mar. 2, 2015 (Year: 2015).*

Song, et al.: "An Evaluation on the Changes of Mechanical Properties of Plastics by Ni—Cr Plating", KSAE07-F0262, Product & Processing Technology Team , LG Chem. Tech Center, 2007, pp. 1622-1627.

Jonoobi, et al.: "Mechanical properties of cellulose nanofiber (CNF) reinforced polylactic acid (PLA) prepared by twin screw extrusion", Composites Science and Technology, Elsevier, vol. 70, No. 12, 2010, pp. 1742-1747.

John Bird, Newnes Engineering and Physical Science Pocket Book, 3rd edition, pp. 259-262 (2001).

* cited by examiner

[FIG. 1]
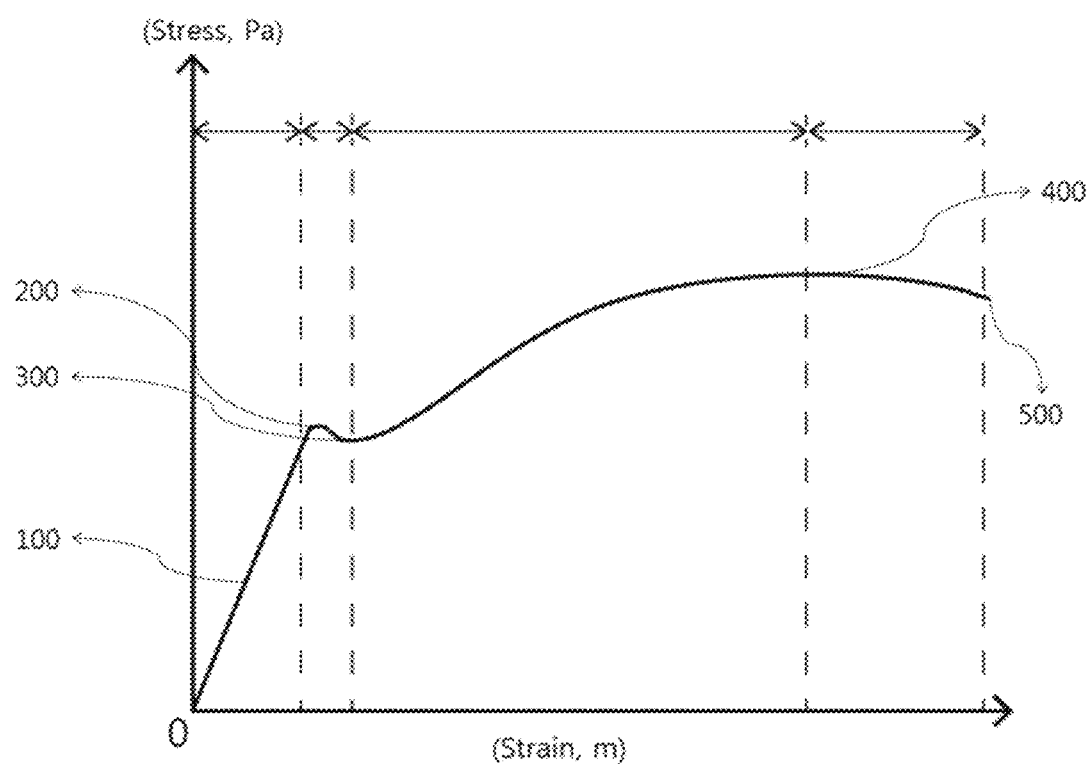

[FIG. 2]
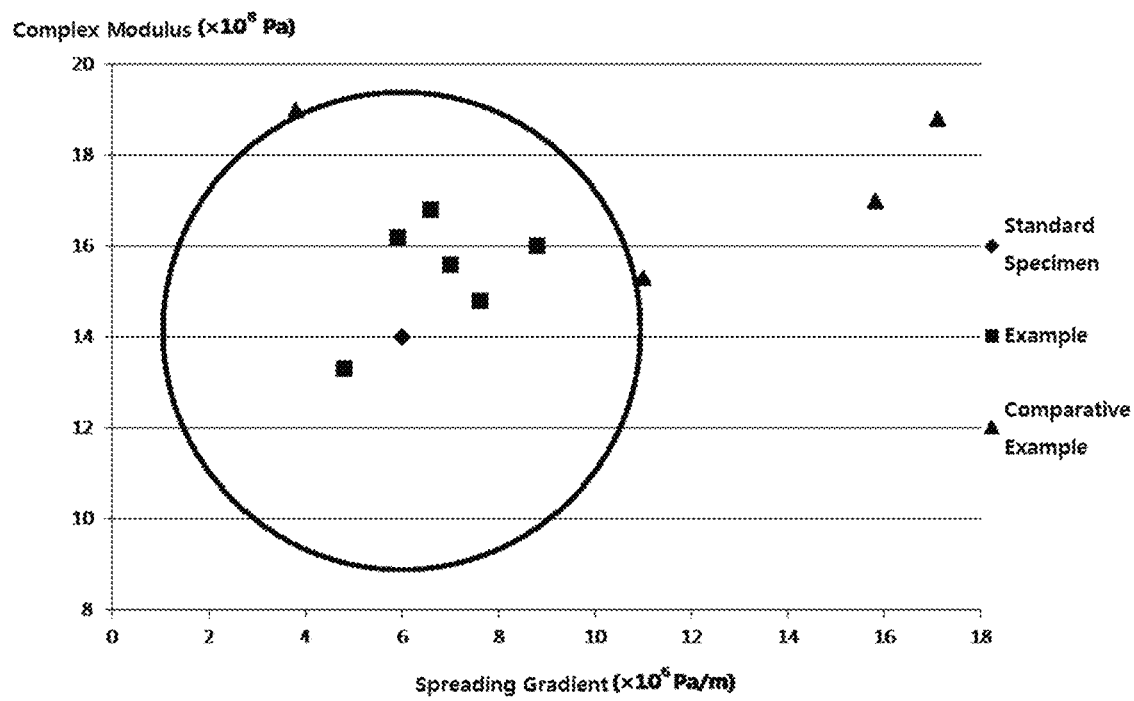
[FIG. 3]
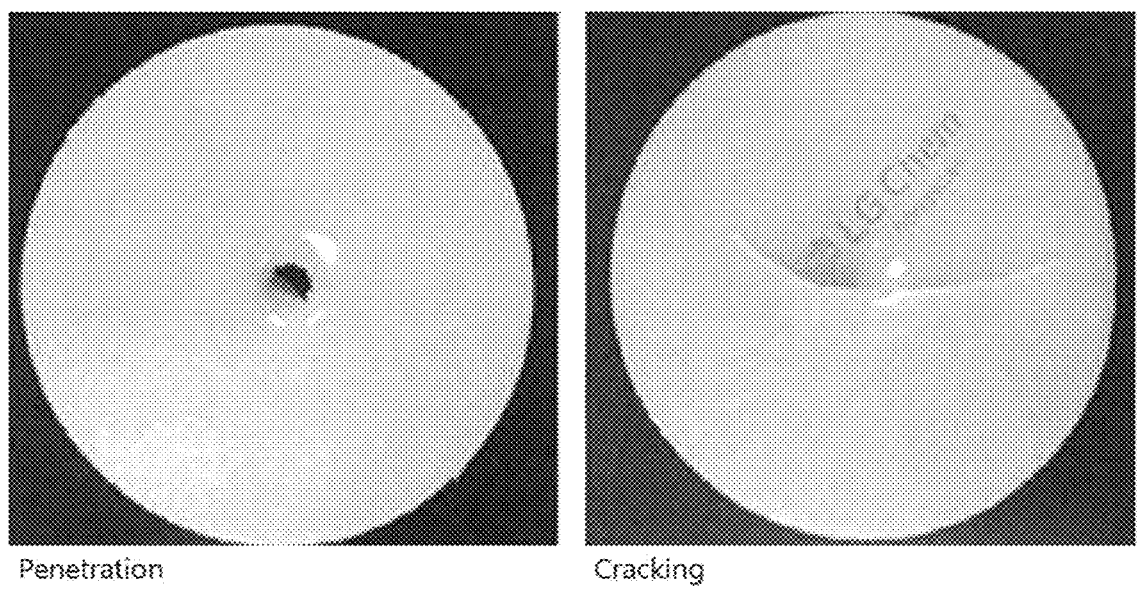
Penetration Cracking

METHOD FOR EVALUATING PROPERTIES OF PLASTIC RESIN PRODUCT

CROSS-REFERENCE TO RELATED APPLICATION(S)

This application is the national stage of International Application No. PCT/KR2017/002587 filed on Mar. 9, 2017, and claims the benefit of Korean Application No. 10-2016-0031484, filed on Mar. 16, 2016 all of which are hereby incorporated by reference in their entirety for all purposes as if fully set forth herein.

TECHNICAL FIELD

The present invention relates to a method for evaluating the properties of a plastic resin molded product, more specifically to a novel method for evaluating the properties of a plastic resin molded product that can exactly derive impact resistance of practically prepared molded products, using property measurement values by the existing ASTM.

BACKGROUND ART

Plastic is a kind of a polymer compound that can be molded using heat and/or pressure, and is polymer that is easy to process, is dissolved when heat is applied, and returns to a solid state if a temperature is sufficiently lowered.

Since plastics are easy to process in various forms and a part of them can be recycled, currently, various kinds of plastic resin molded products are being used.

In general, such plastic can be obtained by polymerizing monomer compounds, and the polymerized resin or resin composition may be processed and stored in the form of a pellet, and molded by various methods according to use, thus preparing products.

In order to confirm the mechanical properties of the plastic resin molded product, various measuring methods such as tensile strength, elongation, impact strength, flexural strength, etc. are being suggested, but required properties are different according to practically prepared products, and the basic properties are tested after manufacturing a specimen, and thus, it was difficult to infer the properties required for practical products of various forms

DETAILED DESCRIPTION OF THE INVENTION

Technical Problem

It is an object of the present invention to provide a novel method for evaluating the properties of a plastic resin molded product that can exactly derive impact resistance of practically prepared molded products, using the property measurement values by the existing standard measurement method.

Technical Solution

The present invention provides a method for evaluating the properties of plastic resin molded product, comprising the steps of: measuring length change compared to the stress applied until a specimen is cut, by ASTM D638, for a plastic resin specimen, to schematize a stress value to a strain value; confirming the minimum point and the second maximum point of the schematized measured values; and calculating the spreading gradient value of the plastic resin specimen between the minimum point and the second maximum point.

Advantageous Effects

The method for evaluating the properties of plastic resin molded product of the present invention can exactly derive impact resistance of a practically prepared molded product, only with the basic properties measured for a polymer resin molded product prepared as a specimen, without preparing a practical product and measuring the properties, and thus, is economical in terms of time and cost.

BRIEF DESCRIPTION OF DRAWINGS

FIG. 1 is a graph showing the stress applied and change in strain, in a plastic resin specimen.

FIG. 2 is a distribution drawing showing complex modulus of elasticity to spreading gradient, in a plastic resin specimen.

FIG. 3 shows the images showing the impact resistance test results of a plastic resin molded product.

DETAILED DESCRIPTION OF THE EMBODIMENTS

The method for evaluating the properties of plastic resin molded product of the present invention comprises the steps of: measuring length change compared to the stress applied until a specimen is cut, by ASTM D638, for a plastic resin specimen, to schematize a stress value to a strain value; confirming the minimum point and the second maximum point of the schematized measured values; and calculating the spreading gradient value of the plastic resin specimen between the minimum point and the second maximum point.

As used herein, terms "a first", "a second" and the like are used to explain various constructional elements, and they are used only to distinguish one constructional element from other constructional elements.

And, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Throughout the specification, plastic resin means polymer plastic resin including thermosetting plastic or thermoplastic plastic.

The method for evaluating the properties of plastic resin molded product according to one aspect of the present invention comprises the steps of: measuring the length change of a plastic resin specimen compared to the stress applied until the specimen is cut by ASTM D638, to schematize the stress value to the strain value; confirming the minimum point and the second maximum point of the schematized measured values; and calculating the spreading gradient value of the plastic resin specimen between the minimum point and the second maximum point.

Throughout the specification, the minimum point means a point where strain begins again according to stress increase after passing a yield point, in a stress to strain graph, measured by ASTM D638 for a plastic resin specimen, and which appears as the minimum value of the stress in the graph.

And, the second maximum point means a point where ultimate tensile strength(UTS) is reached, after passing an yield point, i.e., the first maximum point, and passing through the strain hardening zone where permanent elongation occurs, in a stress to strain graph, measured by ASTM D638 for a plastic resin specimen, and which appears as the maximum value of the stress in the graph (UTS point).

And, in the specification, the Spreading Gradient Value means the mean change rate of stress to strain $$\left(\frac{\Delta stress}{\Delta strain}\right),$$

in the strain hardening zone where permanent elongation occurs, between the above defined minimum point and the second maximum point. Namely, it may be considered as the mean value of the gradient in the strain hardening zone, in a stress to strain graph, measured by ASTM D638.

FIG. 1 is a graph showing the stress applied and change in strain, in a plastic resin specimen.

Referring to FIG. 1, the method for evaluating the properties of a plastic resin molded product according to one aspect of the present invention comprises the steps of: measuring length change compared to the stress applied until a specimen is cut, by ASTM D638, for a plastic resin specimen, to schematize the stress value to the strain value; confirming the minimum point(300) and the second maximum point(400) of the schematized measured values; and calculating the spreading gradient value of the plastic resin specimen between the minimum point and the second maximum point.

In case the properties of polymer resin molded products are measured by the methods stated in the existing ASTM, etc., although tensile strength and elongation, etc. can be identified, the properties regarding impact resistance, etc. cannot be identified, and thus, there was inconvenience in that a separate specimen in the form of a plate or a basket should be manufactured so as to measure the properties regarding impact.

However, according to the present invention, with one measurement, not only the existing elasticity-related properties such as tensile strength, elongation, etc. but also the above-defined spreading gradient value in the obtained Strain vs. Stress graph can be measured, which may be compared with the values of a standard values, thereby deriving impact-related properties.

According to one embodiment, the method for evaluating the properties of plastic resin molded product may further comprises the step of measuring the complex modulus of elasticity of the plastic resin specimen.

Namely, although impact-related properties can be expected only with the spreading gradient value, in case the complex modulus of elasticity is used together, impact-related properties can be derived more exactly, and additionally, spiral flow and flexural strength values can be also expected easily.

According to one embodiment, the method for evaluating the properties of plastic resin molded product may further comprises the step of measuring the complex modulus of elasticity to the spreading gradient value of the plastic resin specimen, after measuring the complex modulus of elasticity.

More specifically, the step may be progressed by introducing the measured spreading gradient value and complex modulus of elasticity into the following Mathematical Equation 1.

[Mathematical Equation 1]

$$(X-a)^2+(Y-b)^2 \leq 25 \quad \text{[Mathematical Equation 1]}$$

in the Mathematical Equation 1,

X means a spreading gradient value (measured as a 10^6 Pa/m unit),

Y means a complex modulus of elasticity value (measured as a 10^8 Pa unit), a is the spreading gradient value of a standard specimen, and b is the complex modulus of elasticity value of a standard specimen.

FIG. 2 is a distribution drawing showing complex modulus of elasticity to spreading gradient, in a plastic resin specimen.

Referring to FIG. 2, it can be definitely confirmed that by showing the spreading gradient values and the complex modulus of elasticity values of each specimen by a diagram, and using the spreading gradient value and the complex modulus of elasticity value of a standard specimen, according to the equation of a circle around them, property measurement is enabled.

The evaluation method of the present invention can be applied for various plastic polymer resin prepared in the form of molded products.

For example, it may be applied for plastic resin wherein the melt flow index(MI), measured by ASTM 1238, is about 5 to about 10 g/10 minutes, preferably about 7 to about 8 g/10 minutes.

According to another embodiment of the present invention, the method may be applied for plastic resin wherein the melt flow rate ratio under load ($MI_5/MI_{2.16}$, MFRR), measured by ASTM 1238, is about 3 to about 4, preferably about 3.1 to about 3.5.

According to still another embodiment of the present invention, the method may be applied for plastic resin wherein the density value measured by ASTM 1505 is about 0.9 to about 1 g/cm$^3$, preferably about 0.950 to about 0.970 g/cm$^3$.

And, specifically, it may be applied for various thermosetting or thermoplastic resins for preparing products in which impact resistance is considered to be important, such as polystyrene-based resin, polyolefin-based resin, polyvinylchloride-based resin, poly(meth)acryl-based resin, polyamide-based resin, ABS-based resin, urethane epoxy-based resin, urethane acryl-based resin, amino resin, phenol resin and polyester-based resin, etc., but in case applied for thermoplastic plastic resin, more exact evaluation results may be exhibited, and it may be preferable that it is applied for polyolefin-based resin such as polyethylene and polypropylene resin etc., among them.

Hereinafter, the actions and the effects of the invention will be explained in more detail through the specific examples of the invention. However, these examples are presented only as the illustrations of the invention, and the scope of the invention is not determined thereby.

EXAMPLE

Preparation of Plastic Resin Specimens

Polyethylene resin having the property values of the following Table 1 was dried in a 40° C. vacuum oven overnight, and prepared in the form of a pellet using a twin screw extruder (BA-19, manufacturing company BAUTECH).

The pellet-formed resin obtained by compression was dried again in a 40° C. vacuum oven overnight, and then, using Xplore 5.cc micro injection molding machine, dog bone specimens were manufactured under the conditions of 230° C., $N_2$ pressure 8 bar for 30 seconds, and 10 bar for 30 seconds (length: 2.7 in, width: 0.125 in(center, minimum value), 0.27 in(end, maximum value), thickness: 0.125 in)

The basic properties of the prepared specimen are as follows.

1) density
measured by ASTM 1505.
2) melt index(MI):
Measured at 190° C., by ASTM 1238.

TABLE 1

|  | MI | Density |
|---|---|---|
| Example 1 | 8.3 | 0.957 |
| Example 2 | 9.1 | 0.957 |
| Example 3 | 8.3 | 0.959 |
| Example 4 | 7.5 | 0.959 |
| Example 5 | 8.6 | 0.961 |
| Example 6 | 7.5 | 0.961 |
| Comparative Example 1 | 9.5 | 0.961 |
| Comparative Example 2 | 6.0 | 0.961 |
| Comparative Example 3 | 8.0 | 0.956 |
| Comparative Example 4 | 7.7 | 0.955 |

Property Evaluation

Evaluation Example

Measurement of spreading gradient

The above prepared specimen was measured at a speed of 200 mm/min, using Z010 Universal Testing Machine (Zwick Company), and the spreading gradient value was calculated by the above explained method and the mean value of total 5 tests was indicated as the result.

Measurement of complex modulus of elasticity:
Measured using Dynamic Mecahnical Analysis.

Comparative Evaluation Example

Measurement of Spiral flow
Measured by ASTM D 3123.

Evaluation of Impact Resistance 1:

A cylindrical basket with the average thickness of 2 mm and volume of 20 L was manufactured and filled with water, the cover was closed, and then, it was vertically dropped from the height of 2 m to evaluate impact resistance. The same experiment was repeated 10 times, and if the evaluated sample was not cracked at all, it was evaluated as good, if broken one or two times among the 10 times, evaluated as fair, and if broken three times or more, evaluated as poor.

Evaluation of Impact Resistance 2:

Under the same conditions as 7-1, the cylindrical basket was vertically dropped while being laid on the side to evaluate impact resistance. The same experiment was repeated 10 times, and if the evaluated sample was not cracked at all, it was evaluated as good, if broken one or two times among the 10 times, evaluated as fair, and if broken three times or more, evaluated as poor.

Evaluation of Impact Resistance 3:

A circular plate specimen with the thickness of 2 mm was manufactured and fixed on a mount with an open base, and then, a 21.2 kg dart made of SUS was vertically dropped from the height of 1 m, the experiment was repeated 10 times and impact resistance was evaluated as the number of penetration or cracking of the specimen.

FIG. 3 show the images showing the impact resistance test results of the plastic resin molded product. Referring to FIG. 3, the penetration and cracking of the specimen in the form of a circular plate can be confirmed.

Flexural strength:
Measured by ASTM D 790.

The measurement results are summarized in the following Table 2.

TABLE 2

| | Evaluation Example | | Comparative Evaluation Example | | | | |
|---|---|---|---|---|---|---|---|
| | Spreading gradient ($10^6$ Pa/m) | Complex modulus of elasticity ($10^8$ Pa) | Impact resistance 1 | Impact resistance 2 | Impact resistance 3 | Spiral flow (cm) | Flexural strength (kgf/cm$^2$) |
| Example 1 | 7.6 | 14.8 | Good | Good | 0 | — | — |
| Example 2 | 4.8 | 13.3 | Good | Good | 0 | — | — |
| Example 3 | 8.8 | 16 | Good | Good | 0 | — | — |
| Example 4 | 7 | 15.6 | Good | Good | 0 | — | — |
| Example 5 | 5.9 | 16.2 | Good | Good | 0 | 19.5 | 12000 |
| Example 6 | 6.6 | 16.8 | Good | Good | 0 | 20.2 | 12100 |
| Comparative Example 1 | 4 | 18.6 | Fair | Good | 1 | 16 | 12000 |
| Comparative Example 2 | 17.1 | 18.8 | Poor | Poor | 5 | — | — |
| Comparative Example 3 | 15.8 | 17 | Fair | Poor | 3 | — | — |
| Comparative Example 4 | 10.7 | 15.3 | Good | Good | 0 | 18 | 10200 |

In the Table 2, referring to Comparative Evaluation Examples, it can be confirmed that all the compounds of Examples exhibit excellent results in the impact resistance evaluation, and the spiral flow and flexural strength are also generally excellent.

To the contrary, in the Evaluation Examples, it can be confirmed that the spreading gradient values of the specimens of Examples 1 to 6 are measured to be about 4.8 to about 8.8, and Comparative Examples are out of this range, and it can be clearly confirmed that in the case of Comparative Examples, impact resistance test results in the Comparative Evaluation Examples are generally inferior to Examples.

FIG. 2 is a distribution diagram showing the complex modulus of elasticity to spreading gradient in the specimens of Examples and Comparative Examples.

Referring to FIG. 2, it can be seen that in the case of Examples, the values of complex moduli of elasticity to spreading gradients are all included and distributed in the area corresponding to the radius 5 from the value of the standard specimen, and that in the case of Comparative Examples, distributed outside of the corresponding area.

Particularly, it can be confirmed that Comparative Example 4 exhibits good results in the impact resistance evaluation, but spiral flow is lowered compared to Examples, and particularly flexural strength is lowered about 20% compared to Examples.

Namely, it can be confirmed that even if only spreading gradient is measured using the existing basic property measuring device as in the Evaluation Examples, impact resistance-related properties can be easily derived without separate experiments, and that if considering complex modulus of elasticity together and applying the value of Mathematical Equation 1, not only impact resistance-related properties but also spiral flow and flexural strength can be also derived to some degree.

EXPLANATION OF SIGN

100: Elastic zone
200: yield point
300: minimum point
400: second maximum point
500: cut point

The invention claimed is:

1. A method for evaluating properties of a plastic resin molded product, comprising the steps of:
   measuring length change compared to stress applied until a plastic resin specimen is cut, according to a published ASTM D638, to schematize a stress value to a strain value;
   confirming a minimum point and a second maximum point of the schematized measured values;
   calculating a spreading gradient value of the plastic resin specimen between the minimum point and the second maximum point;
   measuring complex modulus of elasticity of the plastic resin specimen; and
   comparing measured values of the plastic resin specimen with measured values of a standard specimen,
   wherein the plastic resin molded product satisfies Mathematical Equation 1:

[Mathematical Equation 1]

$$(X-a)^2+(Y-b)^2 \leq 25$$

wherein, in Mathematical Equation 1:
   X is the spreading gradient value of the plastic resin specimen, measured as a 10^6 Pa/m unit,
   Y is the complex modulus of elasticity of the plastic resin specimen, measured as a 10^8 Pa unit,
   a is a spreading gradient value of the standard specimen, and
   b is a complex modulus of elasticity value of the standard specimen.

2. The method for evaluating the properties of plastic resin molded product according to claim 1, wherein the minimum point is a point where strain begins again according to stress increase after passing a yield point in a stress to strain graph for the plastic resin specimen, measured according to the published ASTM D638.

3. The method for evaluating the properties of plastic resin molded product according to claim 1, wherein the second maximum point is a point where ultimate tensile strength_(UTS) is reached in a stress to strain graph for the plastic resin specimen, measured according to the published ASTM D638.

4. The method for evaluating the properties of plastic resin molded product according to claim 1, wherein a melt flow index (MI) of the plastic resin specimen, measured according to a published ASTM D1238, is 5 to 10 g/10 minutes.

5. The method for evaluating the properties of plastic resin molded product according to claim 1, wherein a melt flow rate ratio under load of the plastic resin specimen ($MI_5/MI_{2.16}$, MFRR), measured according to a published ASTM D1238, is 3 to 4.

6. The method for evaluating the properties of plastic resin molded product according to claim 1, wherein a density value of the plastic resin specimen, measured according to a published ASTM D1505, is 0.950 to 0.970 g/cm$^3$.

7. The method for evaluating the properties of plastic resin molded product according to claim 1, wherein a material of the plastic resin specimen is a polyolefin resin.

* * * * *